United States Patent
Brito

(10) Patent No.: US 12,460,706 B2
(45) Date of Patent: Nov. 4, 2025

(54) EPICYCLIC SYSTEM WITH BEVEL ATTACHMENT FOR DUAL-POWER APPLICATIONS

(71) Applicant: Pratt & Whitney Canada Corp., Longueuil (CA)

(72) Inventor: Roberto Brito, Beloeil (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 45 days.

(21) Appl. No.: 18/533,770

(22) Filed: Dec. 8, 2023

(65) Prior Publication Data

US 2025/0189022 A1    Jun. 12, 2025

(51) Int. Cl.

| F16H 37/06 | (2006.01) |
|---|---|
| B64D 35/02 | (2006.01) |
| F01D 15/12 | (2006.01) |
| F02C 7/32 | (2006.01) |
| F16H 57/08 | (2006.01) |
| F16H 57/02 | (2012.01) |

(52) U.S. Cl.
CPC ........... F16H 37/065 (2013.01); B64D 35/02 (2013.01); F01D 15/12 (2013.01); *F05D 2260/40311* (2013.01); *F16H 2057/0203* (2013.01); *F16H 2057/02043* (2013.01); *F16H 2057/02082* (2013.01)

(58) Field of Classification Search
CPC ......... F16H 37/065; F16H 2057/02043; F16H 2057/0203; F16H 2057/02082; F01D 15/12; F01D 2260/40311; B64D 35/02
See application file for complete search history.

(56) References Cited

U.S. PATENT DOCUMENTS

| 3,939,735 A | 2/1976 | Lewis |
|---|---|---|
| 5,152,668 A | 10/1992 | Bulman et al. |
| 6,896,564 B2 | 5/2005 | Willmot |
| 10,273,883 B2 | 4/2019 | Roach et al. |
| 11,041,462 B2 | 6/2021 | Kupratis et al. |
| 2017/0284524 A1 | 10/2017 | Lee |
| 2018/0306121 A1* | 10/2018 | Curlier .................... F16H 1/203 |
| 2020/0291817 A1* | 9/2020 | Leque .................. F01M 11/064 |
| 2020/0386188 A1* | 12/2020 | Kupratis .................. F02C 7/32 |

FOREIGN PATENT DOCUMENTS

| CA | 2466562 C | 7/2010 |
|---|---|---|
| DE | 102021110412 A1 | 10/2021 |
| WO | 2008044972 A1 | 4/2008 |

OTHER PUBLICATIONS

Extended European Search Report for EP Application No. 24218414.1, dated Apr. 23, 2025, pp. 1-15.

* cited by examiner

*Primary Examiner* — Tinh Dang
(74) *Attorney, Agent, or Firm* — CANTOR COLBURN LLP

(57) ABSTRACT

A reduction gearbox of an aircraft propulsion system includes an input shaft configured to input rotational energy into the reduction gearbox, an output shaft configured to output rotational energy from the reduction gearbox to a propulsor of the aircraft propulsion system, and an epicyclic gear arrangement mechanically coupling the output shaft to the input shaft. A transfer gear is positioned at a component of the epicyclic gear arrangement and is configured to mechanically couple an accessory component to the reduction gearbox.

12 Claims, 5 Drawing Sheets

EPICYCLIC SYSTEM WITH BEVEL ATTACHMENT FOR DUAL-POWER APPLICATIONS

BACKGROUND

The present disclosure relates to aircraft engines and, more particularly, to high-power extraction from the aircraft engine and/or supplemental power input to the aircraft engine via externally mounted accessories.

In an aircraft, gas turbine engines are used to turn propellors, fans and turboshafts during various flight operations. Gas turbine engines can also be used to drive generator operations. Additionally, supplemental power may be added to the motor or engine via an externally mounted accessory, such as an electric motor, also known as an emotor. In any case, a gearbox is typically provided and configured to take rotational energy as an input from the gas turbine engine and to transfer that rotational energy to an externally connected accessory, such as a generator.

Such a connection is typically made at an output shaft of the gas turbine engine, but it is desired to make the gas turbine engine and accessory system more compact, especially in an axial direction, and connection at this location limits the ability to do so.

BRIEF DESCRIPTION

In one exemplary embodiment, a reduction gearbox of an aircraft propulsion system includes an input shaft configured to input rotational energy into the reduction gearbox, an output shaft configured to output rotational energy from the reduction gearbox to a propulsor of the aircraft propulsion system, and an epicyclic gear arrangement mechanically coupling the output shaft to the input shaft. A transfer gear is positioned at a component of the epicyclic gear arrangement and is configured to mechanically couple an accessory component to the reduction gearbox.

Additionally or alternatively, in this or other embodiments the transfer gear is positioned at a planet carrier of the epicyclic gear arrangement.

Additionally or alternatively, in this or other embodiments the epicyclic gear arrangement is configured as one of a planetary arrangement or a solar arrangement.

Additionally or alternatively, in this or other embodiments the transfer gear is positioned at a ring gear of the epicyclic gear arrangement.

Additionally or alternatively, in this or other embodiments the transfer gear is a bevel gear positioned at an outer circumference of one of a planet carrier or a ring gear of the epicyclic gear arrangement.

In another exemplary embodiment, a reduction gearbox and accessory component arrangement of an aircraft propulsion system includes a reduction gearbox including an input shaft configured to input rotational energy into the reduction gearbox, an output shaft configured to output rotational energy from the reduction gearbox to a propulsor of the aircraft propulsion system, and an epicyclic gear arrangement mechanically coupling the output shaft to the input shaft. A transfer gear is positioned at a component of the epicyclic gear arrangement. An accessory component is mechanically coupled to the epicyclic gear arrangement via the transfer gear to transmit rotational energy between the reduction gearbox and the accessory component.

Additionally or alternatively, in this or other embodiments a component bevel gear is configured to mechanically couple the accessory component to the transfer gear.

Additionally or alternatively, in this or other embodiments the transfer gear is positioned at a planet carrier of the epicyclic gear arrangement.

Additionally or alternatively, in this or other embodiments the epicyclic gear arrangement is configured as one of a planetary arrangement or a solar arrangement.

Additionally or alternatively, in this or other embodiments the transfer gear is positioned at a ring gear of the epicyclic gear arrangement.

Additionally or alternatively, in this or other embodiments the transfer gear is a bevel gear positioned at an outer circumference of one of a planet carrier or a ring gear of the epicyclic gear arrangement.

Additionally or alternatively, in this or other embodiments the accessory component is mechanically coupled to the transfer gear via a gear train including at least one gear train shaft.

Additionally or alternatively, in this or other embodiments the at least on gear train shaft is two gear train shafts, including a first gear train shaft coupled to the transfer gear and extending in a first direction therefrom, and a second gear train shaft coupled to the first gear train shaft and extending from the first gear train shaft in a second direction different than the first direction.

Additionally or alternatively, in this or other embodiments the accessory component is one of a generator or a motor.

In yet another exemplary embodiment, a propulsion system of an aircraft includes an engine configured to provide rotational energy to a reduction gearbox. The reduction gearbox includes an input shaft configured to input rotational energy into the reduction gearbox, an output shaft configured to output rotational energy from the reduction gearbox to a propulsor of the aircraft propulsion system, and an epicyclic gear arrangement mechanically coupling the output shaft to the input shaft. A transfer gear is positioned at a component of the epicyclic gear arrangement, and an accessory component is mechanically coupled to the epicyclic gear arrangement via the transfer gear to transmit rotational energy between the reduction gearbox and the accessory component. A propulsor is operably connected to the output shaft and driven by rotation of the output shaft.

Additionally or alternatively, in this or other embodiments a component bevel gear is configured to mechanically couple the accessory component to the transfer gear.

Additionally or alternatively, in this or other embodiments the transfer gear is positioned at a planet carrier of the epicyclic gear arrangement.

Additionally or alternatively, in this or other embodiments the epicyclic gear arrangement is configured as one of a planetary arrangement or a solar arrangement.

Additionally or alternatively, in this or other embodiments the transfer gear is positioned at a ring gear of the epicyclic gear arrangement.

Additionally or alternatively, in this or other embodiments the transfer gear is a bevel gear positioned at an outer circumference of one of a planet carrier or a ring gear of the epicyclic gear arrangement.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description.

DETAILED DESCRIPTION

As will be described below, an aircraft engine, such as a gas turbine engine, has a reduction gearbox installed thereto including a high-power bevel gear that can be matched to a single branch triple reduction (SBTR) component for power extraction or hybrid mode. The SBTR component provides a wide range of potential speed adjustments to reach a required speed at the output from the available power gear speeds. An external accessory, such as an electrical generator or the like, is mechanically coupled to the reduction gearbox system at, for example, a planet carrier or a ring gear of the reduction gearbox system.

Figure 1:
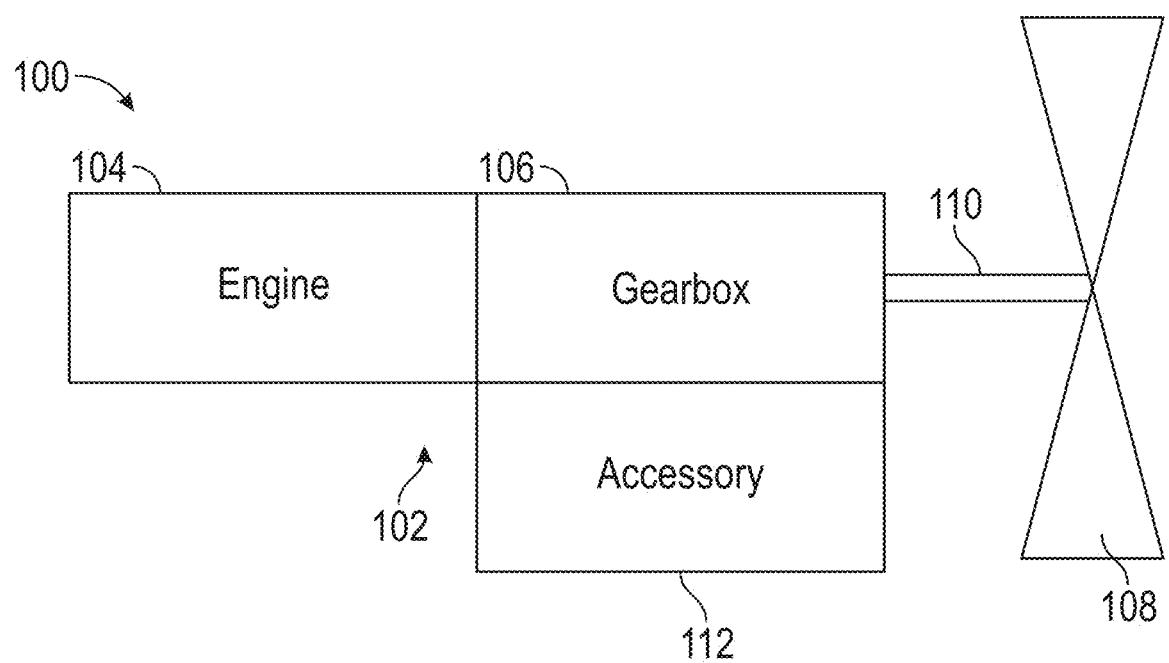
FIG. 1 is a schematic illustration of an embodiment of a propulsion system of an aircraft.

With reference to FIG. 1, an aircraft propulsion system 100 includes an engine assembly 102 including, for example, an engine 104 coupled to a reduction gearbox 106, which in turn is mechanically coupled to a propulsor, such as a propeller 108, via an output shaft 110. In some embodiments, the engine 104 is a gas turbine engine. One or more accessory components 112, such as a generator, are coupled to the reduction gearbox 106, to allow for power extraction from the reduction gearbox 106. Additionally or alternatively the one or more accessory components 112 include an electrical motor or emotor configured to supplement or replace power provided to the reduction gearbox 106 via the engine 104. The reduction gearbox 106 includes at least one epicyclic gear arrangement 114 (illustrated in FIGS. 2, 4 and 5) to which the one or more accessory components 112 are mechanically coupled.

Figure 2:
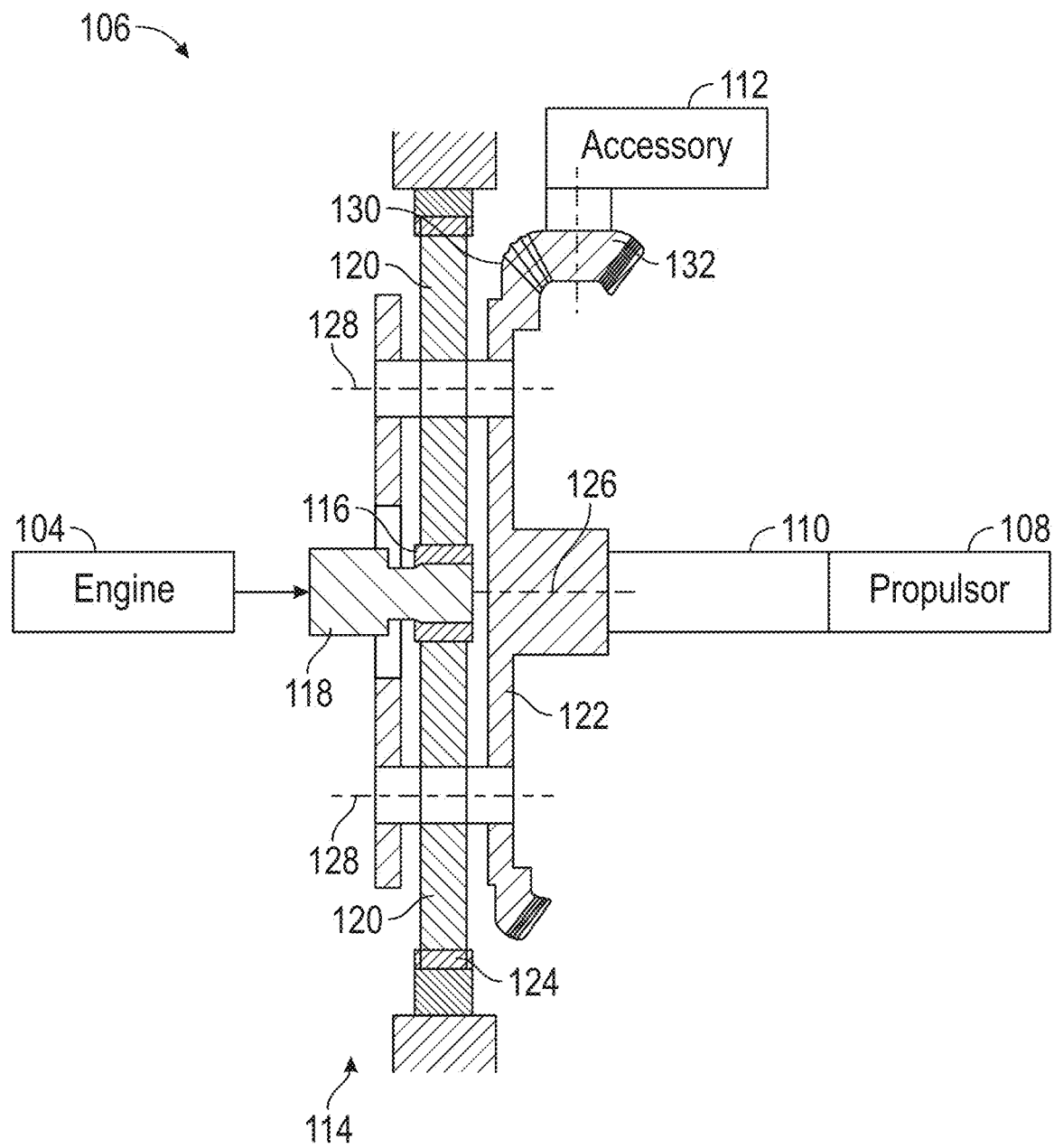
FIG. 2 is a schematic illustration of an embodiment of an epicyclic gear arrangement of a reduction gearbox including a transfer gear.

Referring now to FIG. 2, in one exemplary embodiment the epicyclic gear arrangement 114 is a planetary system including a sun gear 116 mechanically coupled to an input shaft 118 through which rotational energy is provided from the engine 104. The sun gear 116 is meshed or otherwise engaged with a plurality of planet gears 120 arranged about a circumference of the sun gear 116. The plurality of planet gears 120 are connected to and supported by a planet carrier 122. The epicyclic gear arrangement 114 further includes a ring gear 124 disposed about an outer circumference of the plurality of planet gears 120 and is meshed or otherwise engaged with the plurality of planet gears 120. In this planetary system, the ring gear 124 is rotationally fixed, such that rotational energy from the input shaft 118 is transferred through the sun gear 116, which rotates about a gearbox central axis 126 and into the plurality of planet gears 120. The plurality of planet gears 120 are thereby driven to rotate about their respective planet gear axes 128 and to further process about the gearbox central axis 126. This rotational energy is then transferred to the planet carrier 122, driving rotation of the planet carrier 122 about the gearbox central axis 126. The planet carrier 122 is mechanically coupled to the output shaft 110 to drive the propeller 108.

Figure 3A:
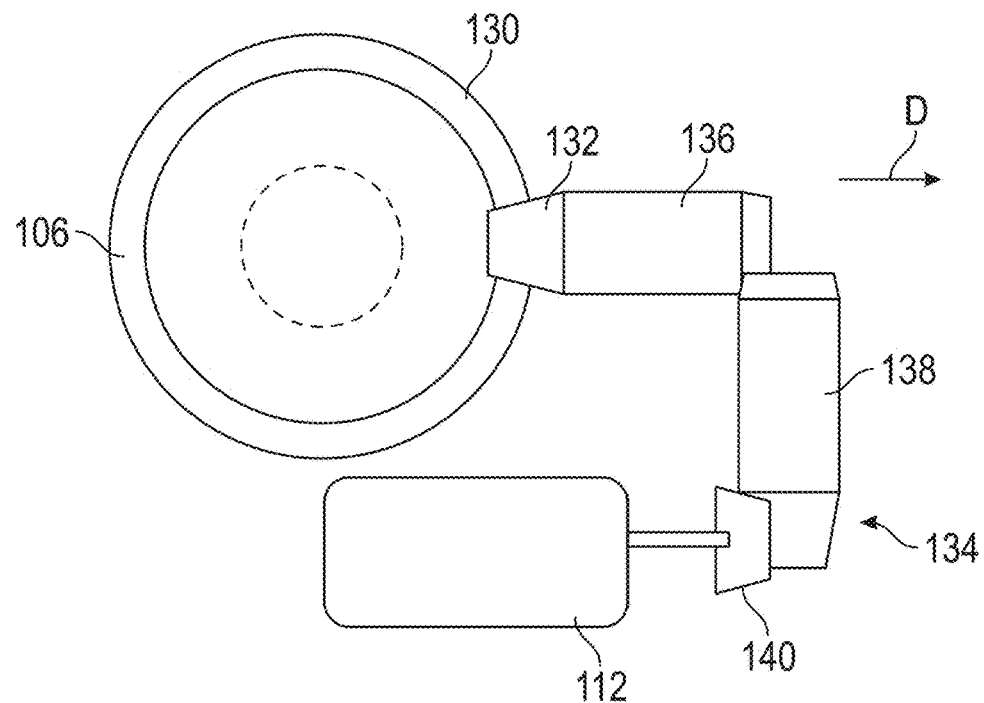
FIGS. 3A and 3B are schematic illustrations of an aircraft motor assembly in which a gear train and an accessory component have multiple orientations in accordance with embodiments.
Figure 3B:
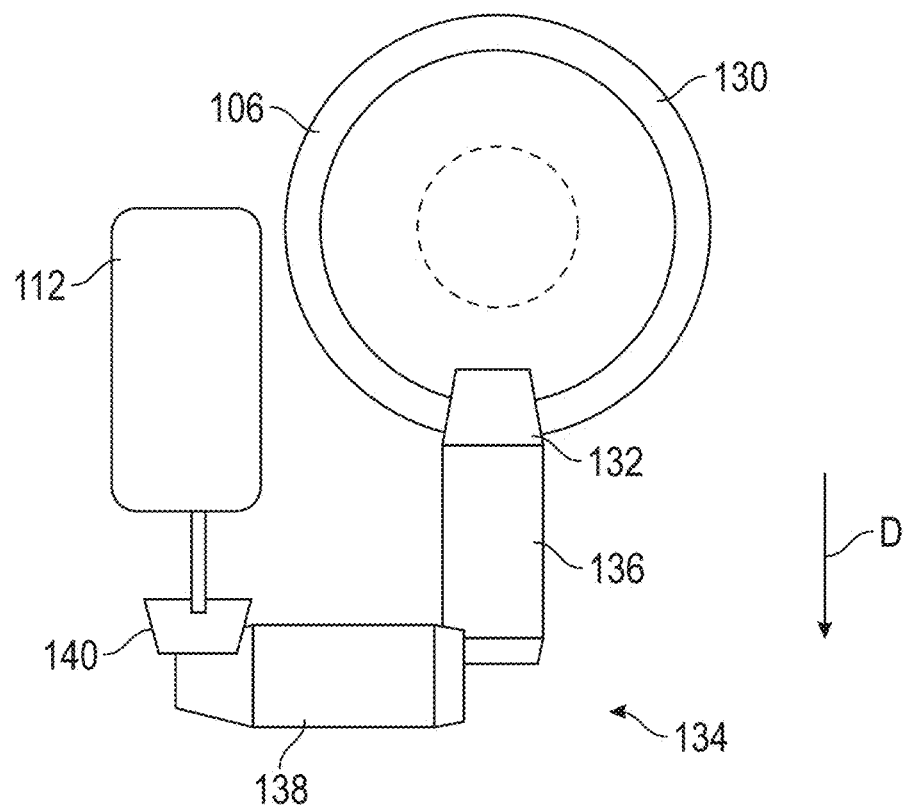

The planet carrier 122 includes a planet bevel gear 130 located at an outer circumference of the planet carrier 122. The planet bevel gear 130 is engaged with an accessory bevel gear 132 to mechanical couple the accessory component 112 to the reduction gearbox 106. In some embodiments, the planet bevel gear 130 and accessory bevel gear 132 directly couple the reduction gearbox 106 to the accessory component 112, while in other embodiments the reduction gearbox 106 is coupled to the accessory component 112 via an accessory gear train 134, as illustrated in FIGS. 3A and 3B. In some embodiments, the planet bevel gear 130 is formed integral to the planet carrier 122, while in other embodiments the planet bevel gear 130 may be connected to the planet carrier 122 via a bolted connected with a plurality of bolts arrayed about a circumference of the planet carrier 122. The bolted connection is configured to reduce potential relative twist or circumferential motion between the planet carrier 122 and the planet bevel gear 130 to improve power transmission through the planet bevel gear 120 to the accessory bevel gear 132.

With reference to FIGS. 3A and 3B, examples of multiple orientations of the accessory gear train 134 are illustrated. As shown in FIG. 3A, the accessory bevel gear 132 is coupled to a first gear train shaft 136 and extends laterally in direction D The accessory gear train 134 then extends downwardly via a second gear train shaft 138 and engages with an accessory input gear 140 of the accessory component 112, which extends in parallel with direction D. In another embodiment as illustrated in FIG. 3B, the first gear train shaft 136 extends downwardly in direction D. The accessory gear train 134 then extends laterally via the second gear train shaft 138 and engages with the accessory input gear 140 of the accessory component 112, which extends in parallel with direction D.

Figure 4:
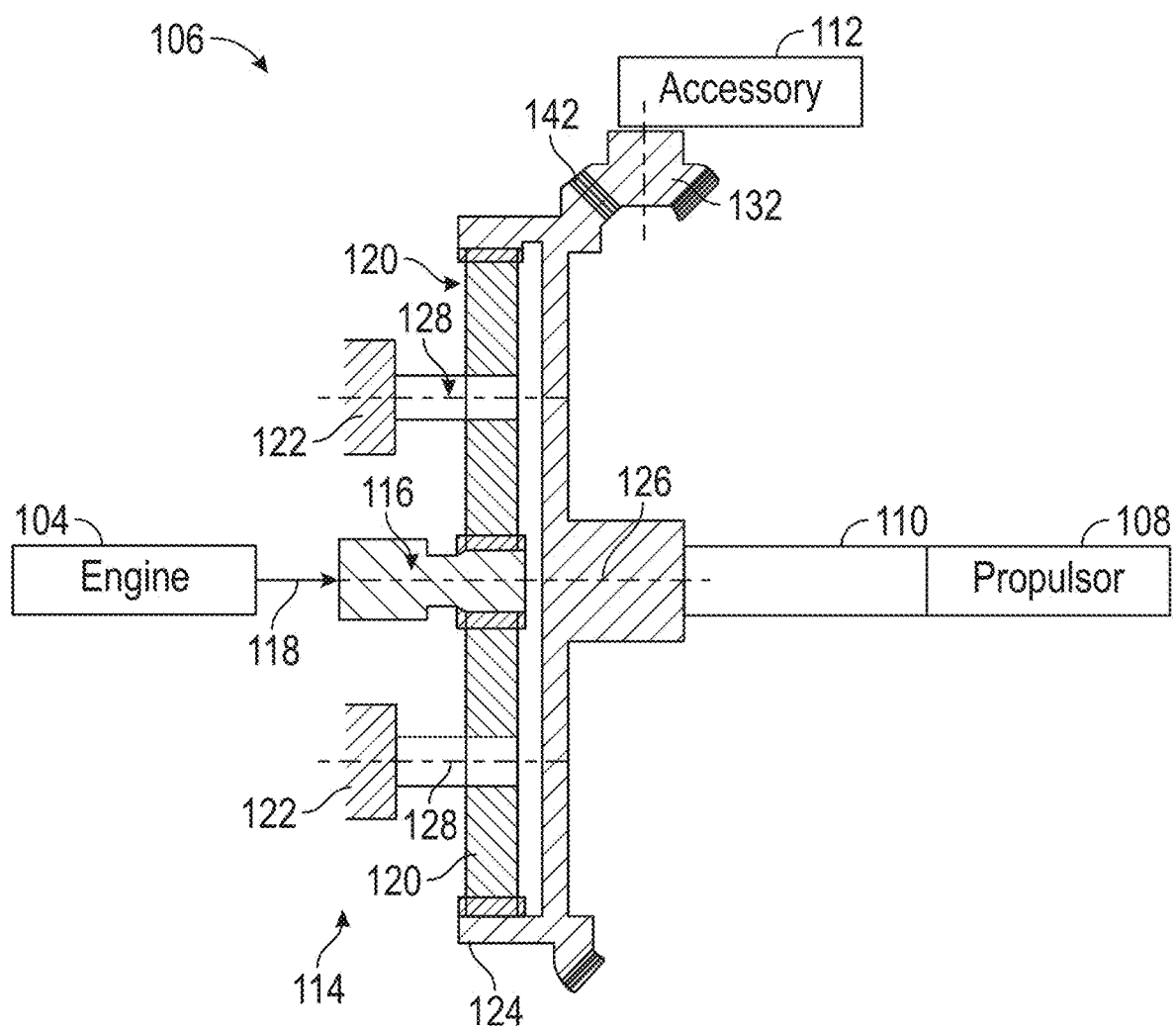
FIG. 4 is a schematic illustration of another embodiment of an epicyclic gear arrangement of a reduction gearbox including a transfer gear.

Referring now to FIG. 4, in another exemplary embodiment the epicyclic gear arrangement 114 is a star system. In the star arrangement, the planet carrier 122 is rotationally fixed relative to the gearbox central axis 126 and the ring gear 124 is configured to rotate about the gearbox central axis 126. In this configuration, the ring gear 124 includes a ring bevel gear 142 which is mechanically coupled to the accessory bevel gear 132. In this embodiment, rotational energy is transferred from the input shaft 118 through the sun gear 116 and to the plurality of planet gears 120. The plurality of planet gears 120 rotate about their respective planet gear axes 128, driving rotation of the ring gear 124 about the gearbox central axis 126. The accessory component 112 is driven by the rotation of the accessory bevel gear 132, which is coupled to the ring gear 124 via the ring bevel gear 142.

Figure 5:
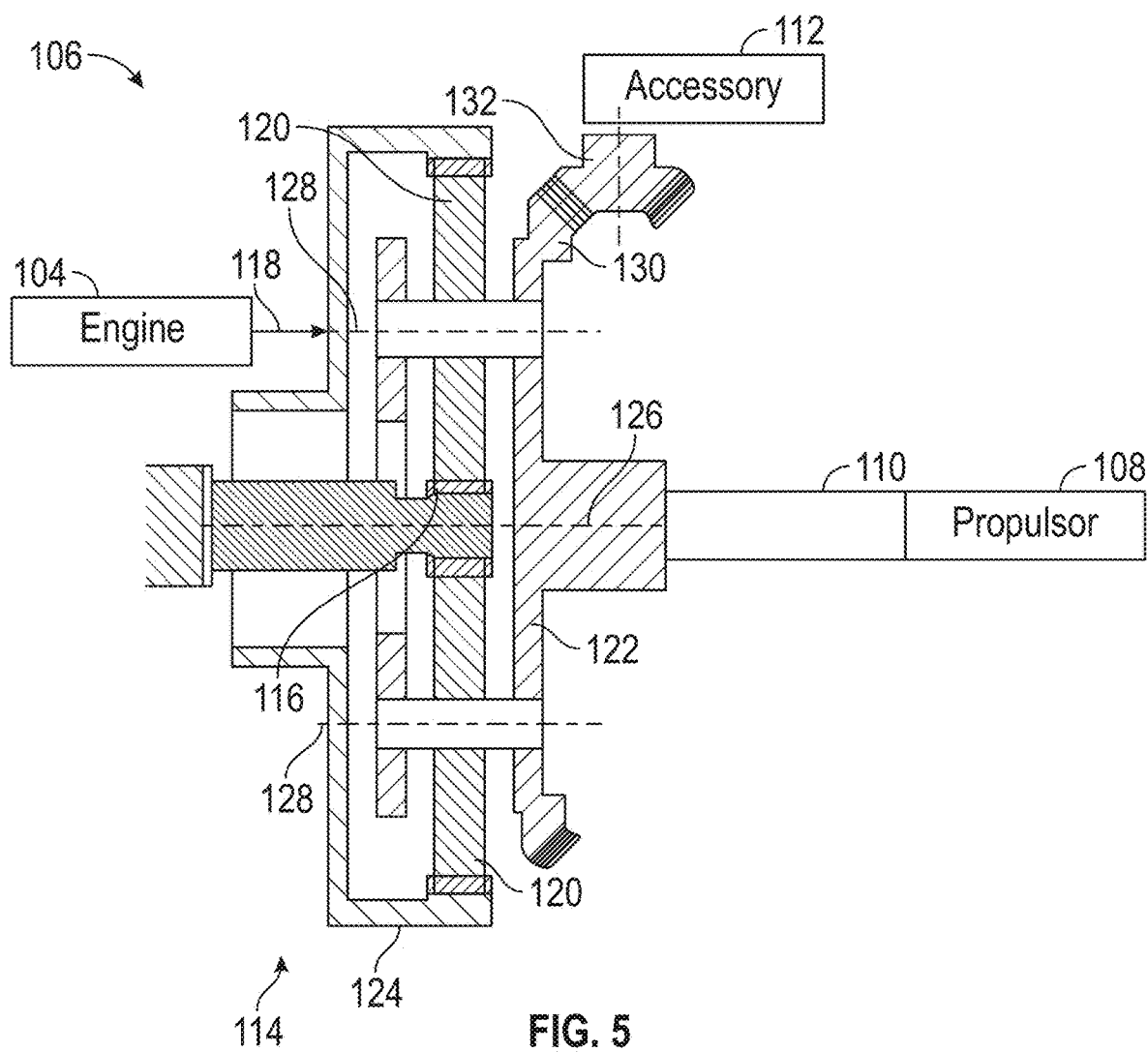
FIG. 5 is a schematic illustration of yet another embodiment of an epicyclic gear arrangement of a reduction gearbox including a transfer gear.

Another exemplary embodiment is illustrated in FIG. 5, in which the epicyclic gear arrangement 114 has a solar arrangement. In the solar arrangement, the input shaft 118 is coupled to the ring gear 124 and the sun gear 116 is rotationally fixed relative to the gearbox central axis 126. Rotational energy is transferred from the ring gear 124 to the plurality of planet gears 120. The plurality of planet gears 120 are thereby driven to rotate about their respective planet gear axes 128 and to further process about the gearbox central axis 126. This rotational energy is then transferred to the planet carrier 122, driving rotation of the planet carrier 122 about the gearbox central axis 126. The planet carrier 122 is mechanically coupled to the output shaft 110 to drive the propeller 108. The planet carrier 122 includes the planet bevel gear 130 located at the outer circumference of the planet carrier 122. The planet bevel gear 130 is engaged with the accessory bevel gear 132 to mechanical couple the accessory component 112 to the reduction gearbox 106.

Technical effects and benefits of the present disclosure are the provision of a reduction gearbox of an aircraft propulsion system in which one or more accessory components are mechanically connected to an epicyclic gear arrangement of the reduction gearbox. This configuration allows for reduction of an axial length of such arrangements compared to traditional arrangements where the accessory components are mechanically coupled to an output shaft of the reduction gearbox.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A reduction gearbox of an aircraft propulsion system, comprising:
    an input shaft configured to input rotational energy into the reduction gearbox;
    an output shaft configured to output rotational energy from the reduction gearbox to a propulsor of the aircraft propulsion system;
    an epicyclic gear arrangement mechanically coupling the output shaft to the input shaft;
    a transfer gear disposed at a component of the epicyclic gear arrangement and configured to mechanically couple an accessory component to the reduction gearbox;
    wherein the transfer gear is a bevel gear disposed at one of a planet carrier or a ring gear of the epicyclic gear arrangement, the transfer gear configured to be coupled directly to a corresponding component bevel gear of an accessory gear train of the accessory component.

2. The reduction gearbox of claim 1, wherein the epicyclic gear arrangement is configured as one of a planetary arrangement or a solar arrangement.

3. The reduction gearbox of claim 1, wherein the transfer gear is disposed at an outer circumference of one of the planet carrier or the ring gear of the epicyclic gear arrangement.

4. A reduction gearbox and accessory component arrangement of an aircraft propulsion system, comprising:
    a reduction gearbox including:
        an input shaft configured to input rotational energy into the reduction gearbox;
        an output shaft configured to output rotational energy from the reduction gearbox to a propulsor of the aircraft propulsion system;
        an epicyclic gear arrangement mechanically coupling the output shaft to the input shaft; and
        a transfer gear disposed at a component of the epicyclic gear arrangement; and
    an accessory component mechanically coupled to the epicyclic gear arrangement via the transfer gear to transmit rotational energy between the reduction gearbox and the accessory component;
    wherein the transfer gear is a bevel gear disposed at one of a planet carrier or a ring gear of the epicyclic gear arrangement, the transfer gear configured to be coupled directly to a corresponding component bevel gear of an accessory gear train of the accessory component.

5. The reduction gearbox and accessory component arrangement of claim 4, wherein the epicyclic gear arrangement is configured as one of a planetary arrangement or a solar arrangement.

6. The reduction gearbox and accessory component arrangement of claim 4, wherein the transfer gear is disposed at an outer circumference of one of the planet carrier or the ring gear of the epicyclic gear arrangement.

7. The reduction gearbox and accessory component arrangement of claim 4, wherein the accessory component is mechanically coupled to the transfer gear via the accessory gear train including at least one gear train shaft.

8. The reduction gearbox and accessory component arrangement of claim 7, wherein the at least on gear train shaft is two gear train shafts, including:
    a first gear train shaft coupled to the transfer gear and extending in a first direction therefrom; and
    a second gear train shaft coupled to the first gear train shaft and extending from the first gear train shaft in a second direction different than the first direction.

9. The reduction gearbox and accessory component arrangement of claim 4, wherein the accessory component is one of a generator or a motor.

10. A propulsion system of an aircraft, comprising:
    an engine configured to provide rotational energy to a reduction gearbox, the reduction gearbox including:
        an input shaft configured to input rotational energy into the reduction gearbox;
        an output shaft configured to output rotational energy from the reduction gearbox;
        an epicyclic gear arrangement mechanically coupling the output shaft to the input shaft; and
        a transfer gear disposed at a component of the epicyclic gear arrangement;
    an accessory component mechanically coupled to the epicyclic gear arrangement via the transfer gear to transmit rotational energy between the reduction gearbox and the accessory component; and
    a propulsor operably connected to the output shaft and driven by rotation of the output shaft;
    wherein the transfer gear is a bevel gear disposed at one of a planet carrier or a ring gear of the epicyclic gear arrangement, the transfer gear configured to be coupled directly to a corresponding component bevel gear of an accessory gear train of the accessory component.

11. The propulsion system of claim 10, wherein the epicyclic gear arrangement is configured as one of a planetary arrangement or a solar arrangement.

12. The propulsion system of claim 10, wherein the transfer gear is disposed at an outer circumference of one of the planet carrier or the ring gear of the epicyclic gear arrangement.

\* \* \* \* \*